(12) United States Patent
Kobylkin

(10) Patent No.: US 11,704,594 B2
(45) Date of Patent: Jul. 18, 2023

(54) MACHINE LEARNING SYSTEM

(71) Applicant: PAYPAL, INC., San Jose, CA (US)

(72) Inventor: Egor Kobylkin, Berlin (DE)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/514,760

(22) Filed: Oct. 29, 2021

(65) Prior Publication Data

US 2022/0051143 A1 Feb. 17, 2022

Related U.S. Application Data

(63) Continuation of application No. 15/138,307, filed on Apr. 26, 2016, now abandoned.

(51) Int. Cl.
| | |
|---|---|
| *G06N 20/00* | (2019.01) |
| *G06F 16/00* | (2019.01) |
| *G06Q 30/0201* | (2023.01) |
| *G06Q 30/02* | (2023.01) |
| *G06Q 30/0202* | (2023.01) |

(52) U.S. Cl.
CPC ............ *G06N 20/00* (2019.01); *G06F 16/00* (2019.01); *G06Q 30/02* (2013.01); *G06Q 30/0201* (2013.01); *G06Q 30/0202* (2013.01)

(58) Field of Classification Search
CPC ........ G06N 20/00; G06F 16/00; G06Q 30/02; G06Q 30/0201; G06Q 30/0202
USPC .......................................................... 706/11
See application file for complete search history.

(56) References Cited

U.S. PATENT DOCUMENTS

| | | | |
|---|---|---|---|
| 4,754,410 A | 6/1988 | Leech et al. | |
| 6,311,173 B1 * | 10/2001 | Levin | ...................... G06F 17/18 |
| | | | 706/45 |
| 9,596,207 B1 | 3/2017 | Lin et al. | |
| 10,467,695 B1 * | 11/2019 | Zitzewitz | ................ G06Q 40/04 |
| 2008/0127149 A1 * | 5/2008 | Kosche | ................... G06F 8/443 |
| | | | 717/158 |

OTHER PUBLICATIONS

Fiebrink, et al. "Toward Understanding Human-Computer Interaction in Composing the Instrument", ResearchGate, Mar. 2012 (Year: 2012).*
Grzymala-Busse J., et al., "Handling Missing Attribute Values", Data Mining and Knowledge Discovery Handbook, 2nd Edition, Springer, 2010, 19 pages.

(Continued)

*Primary Examiner* — Tsu-Chang Lee
(74) *Attorney, Agent, or Firm* — Haynes and Boone, LLP

(57) ABSTRACT

Methods, systems, and computer program products are included for providing a predicted outcome to a user interface. An exemplary method includes receiving, from a user interface, a plurality of identifiers that identify objects. At the user interface, a target success function is selected corresponding to the plurality of identifiers. The target success function is mapped to at least one attribute of one or more attributes of the objects. The at least one attribute of the objects and one or more other attributes are queried. Data values are retrieved corresponding to the queried at least one attribute and the one or more other attributes. Based on the data values, an outcome of the target success function is predicted. The predicted outcome is provided to the user interface.

20 Claims, 4 Drawing Sheets

(56) References Cited

OTHER PUBLICATIONS

Monteiro E., et al., "A Machine Learning Methodology for Medical Imaging Anonymization," 2015 37th Annual Internal Conference of the IEEE Engineering in Medicine and Biology Society (EMBC), downloaded on Sep. 24, 2021, 4 pages.

* cited by examiner

| Identifier Selection 402 | Dallas Customers 404 |
| | Chicago Customers 406 |
| | New York Customers 408 |

| Identifier 418 | Number of Calls 420 | Calls Answered 422 | Products Purchased 424 |
|---|---|---|---|
| John Smith | 5 | 4 | 0 |
| Sally Jones | 6 | 2 | 2 |
| Alex Brown | 3 | 3 | 2 |

MACHINE LEARNING SYSTEM

RELATED APPLICATIONS

This application is a continuation of U.S. Ser. No. 15/138,307, filed Apr. 26, 2016 and is hereby incorporated by reference in its entirety.

BACKGROUND

Field of the Invention

The present disclosure generally relates to machine learning. In particular, the present disclosure relates to an input and analysis subsystems for a machine learning system.

Related Art

Machine learning is a field of computer science used for generating data-driven predictions. In many instances, the data-driven predictions are generated based on complex models that have been developed by data architects. These models may be developed by analyzing historical/training data using supervised learning techniques to determine patterns corresponding to data. Traditionally, these machine learning techniques are highly-technical and are thus targeted for experts in the field of machine learning.

BRIEF DESCRIPTION OF THE DRAWINGS

The present invention is illustrated by way of example and not limitation in the figures of the accompanying drawings.

DETAILED DESCRIPTION

Figure 1:
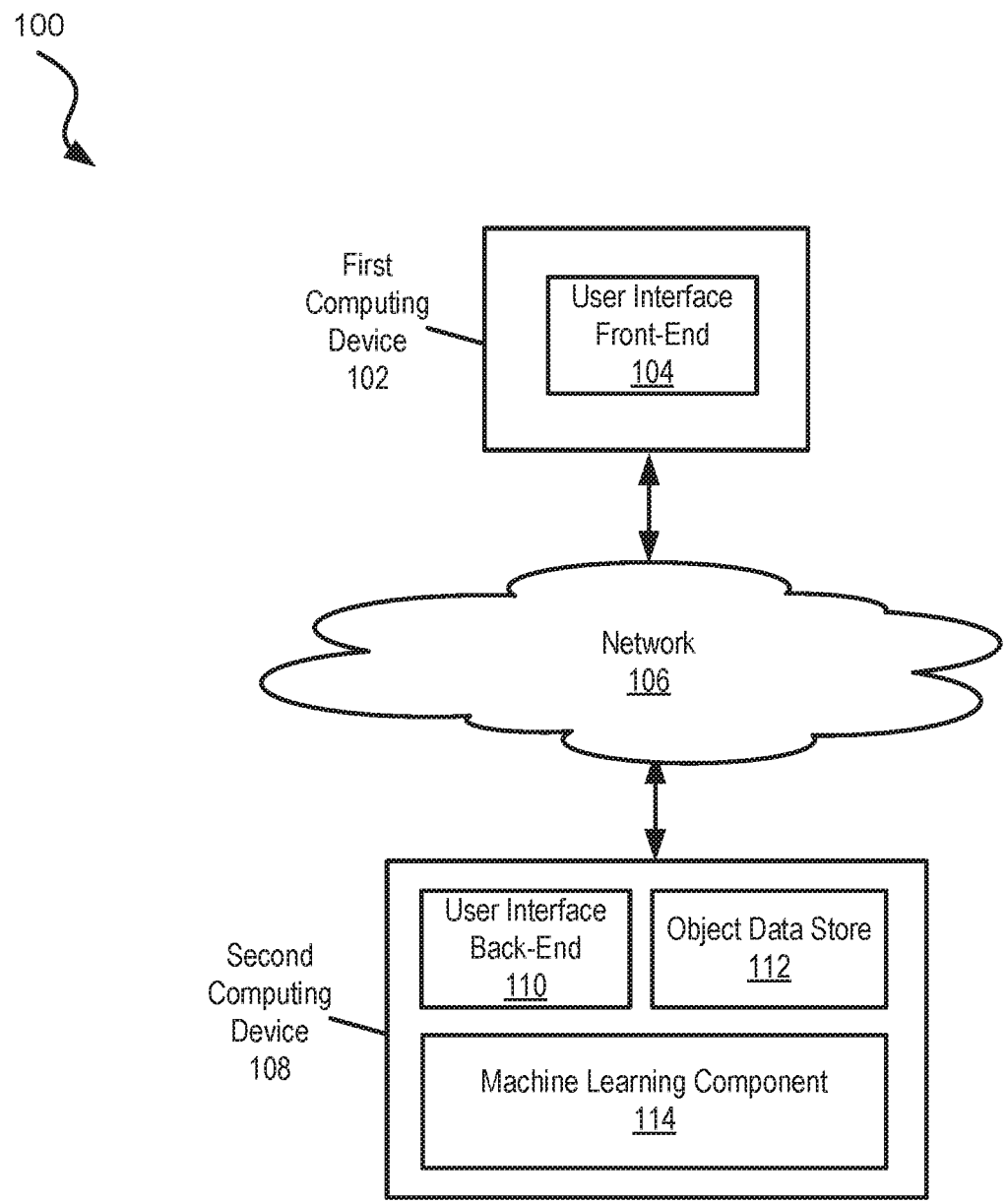
FIG. 1 is a block diagram illustrating a system architecture for determining predictive outcomes using machine learning techniques, in accordance with various examples of the present disclosure.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments provide a system, method, and machine-readable medium for receiving a selection of machine learning input parameters from a user, and responsive to receiving the machine learning input parameters, outputting a predicted outcome. These embodiments use pre-configured mappings associated with the input parameters to simplify use of the machine learning techniques. The simplification of the machine learning techniques allows even non-technical users to input parameters and receive predictive outcomes. Accordingly, the features described herein provide a technical solution for simplifying access to machine learning technology. The technical solution is implemented on at least one computing device, and improves the functioning of the computing device by allowing the computing device to perform machine learning techniques in a manner that is more accessible to non-technical users. This improved functioning may include accessing mapping data structures to perform machine learning techniques using a reduced amount of user inputs.

In the present example, a user interface may be provided by a web-based graphical user interface. The web-based graphical user interface allows users to upload or select identifiers that correspond to objects of a same type. For example, a list of customers may be provided or selected by a user. The list of customers may include identifiers such as the names of the customers. Each customer name may be associated with customer attributes so that the customer name and the customer attributes together form a customer object.

The user interface may also provide one or more target success functions that may be selected or entered by a user. The target success function may be entered by a user selecting the target success function from a list or other user interface element. For example, using the previously discussed example regarding a customer object, a target success function may correspond to a predictive outcome regarding each customer. In more detail, a target success function may be selected to identify a probability that each customer answers a phone, a time period in which each customer is most likely to answer a phone, whether phone contact is likely to result in a sale, or some other predictive outcome corresponding to a customer.

Based on the selection, particular attributes corresponding to the objects identified by the identifiers are provided to a machine learning component. These attributes are selected based on a mapping between the attributes and the selected target success function. The mapping may be provided by a data architect or other user to pre-configure target success functions to minimize knowledge/expertise needed by the users of the user interface. For example, with regard to the customer example above, if the target success function is a likelihood that each customer picks up the phone, the target success function may be mapped to an attribute for each customer that identifies whether the customer previously answered the phone. When the target success function is selected by a user, the attribute(s) mapped to the target success function are provided as input to a machine learning component without requiring selection of the attributes by a user. Accordingly, even users with minimal technical expertise may select identifiers and target success functions to generate predictive outcomes corresponding to the identifiers.

The embodiments disclosed herein provide advantages to current machine learning techniques. For example, advantages may result from the pre-configuration of user interface and machine learning components using mappings/associations to simplify user inputs and render the machine learning techniques to be more accessible to non-technical users. In another example, advantages may result based on the pre-configuration using mappings/associations between object attributes and target success functions, allowing non-technical and technical users alike to more quickly and efficiently determine predicted outcomes. Of course, it is understood that these features and advantages are shared among the various examples herein and that no one feature or advantage is required for any particular embodiment.

FIG. 1 illustrates a system architecture 100 for determining predictive outcomes using machine learning techniques, in accordance with various examples of the present disclosure.

System architecture 100 includes a first computing device 102. In some examples, the first computing device 102 is structured as a client device. The first computing device 102 may represent a single computing device or multiple computing devices. For example, the first computing device 102 may be structured as a cluster of computing devices.

The first computing device 102 is structured with a user interface front-end 104 that is configured to provide a display for one or more users. In some examples, the user interface front-end 104 includes a web browser or other application (such as an "app" on a mobile device) that is configured to send and receive information via a network. In the present example, the user interface front-end 104 is structured with graphical user interface elements that allow a user to input parameters for a machine learning component 114 and receive output from the machine learning component 114. The user interface front-end 104 is structured to display the output via a display such as a monitor. An example front-end user interface is discussed in more detail with respect to FIGS. 4A, 4B and 4C.

In the present example, input parameters may include user selection of one or more object identifiers and at least one target success function. In some examples, the identifiers of the objects are selected from a pre-configured list displayed by the user interface front-end 104. In other examples, the identifiers of the objects are selected from a data store of the first computing device using a dialogue provided by the user interface front-end 104. The user interface front-end 104 may allow the selection of the target success function from a list of one or more target success functions. The user interface front-end 104 is further structured to pass the objects corresponding to the selected identifiers and the selected target success function to the user interface back-end 110 via a network 106.

In some examples, objects represent customers, products, or merchants. Each object may include an identifier that identifies the object. For example, an identifier of a customer object may include the customer's name. In another example, a product may be identified by a product name or by a unique serial number. Similarly, a merchant may be identified by a merchant name.

In the present example, each object identified by an identifier is structured to include one or more attributes that further define the object. For example, a customer object may further include one or more attributes identifying prior purchases by the customer, marketing efforts corresponding to the customer, and/or other information corresponding to the customer.

Turning now to the target success function, the target success function may identify a predictive outcome such as a propensity and/or prediction that a user would like to determine for one or more objects. For example, the user interface front-end 104 may display a selectable target success function for determining the likelihood that one or more customers respond in a particular way to a marketing effort, purchase a product, or have some other propensity for a particular action.

In some examples, users may configure one or more target success functions via the user interface front-end 104. In other examples, the user interface front-end 104 is pre-configured with the one or more success functions. In more detail regarding a target success function, a success function may be structured as an element that is displayed to a user, where the selection of the element causes one or more attributes of the objects to be passed to the user interface back-end 110. For example, the target success function may be structured as a label that is selectable to provide one or more attributes of the selected objects to the user interface back-end 110.

In the present example, the first computing device 102 is communicatively coupled to other computing devices that form a network 106. The network 106 may include one or more network computing devices that are communicatively coupled via transport media to communicate signals between the first computing device 102 and another computing device, such as the second computing device 108, which in some examples is structured as a server device. The second computing device 108 may represent a single computing device or multiple computing devices. For example, the second computing device 108 may be structured as a cluster of computing devices.

The first computing device 102 and the second computing device 108 each include computer hardware elements. Computer hardware elements of each computing device include physical elements such as one or more processors, one or more memories, and a network interface to communicatively couple the computing devices to the network 106. As an example, a network interface may include a network interface card (NIC). Computing device hardware elements that provide hardware structure to the computing devices are further described with respect to FIG. 2.

The second computing device 108 is structured to include a user interface back-end 110. The user interface back-end 110 is structured to receive input parameters from the user interface front-end 104 of the first computing device 102 and, responsive to receiving the input parameters, provide a predictive outcome output to the user interface front-end 104. In some examples, the user interface back-end 110 is structured as a web server, which communicates with the user interface front-end 104 using the Hypertext Transfer Protocol (HTTP) and/or other network protocol.

The user interface back-end 110 may receive objects from the first computing device 102 for storage in an object data store 112. For example, objects may be selected for upload to the object data store 112 by the user interface front-end 104. Accordingly, the user interface back-end 110 is communicatively coupled to the object data store 112.

In the present example, the object data store 112 is structured as one or more databases, flat files, or any other suitable data storage elements. For example, the object data store 112 may be structured as a relational database such as an SQL database. In another example, the object data store 112 may be structured as an XML, database. In more detail, the object data store 112 may be structured to store objects according to a particular format, such as by storing each object in a row, with a first column configured to store an identifier that is a primary key for each object, and with one or more other columns that are configured to store data values corresponding to each of the attributes of the objects. In other examples, the object data store 112 may be formatted and/or structured to store objects in other ways.

In the present example, the system 100 includes a machine learning component 114 that is structured to receive data values corresponding to attributes from the user interface back-end 110 and/or the object data store 112. As previously described, input parameters received from the user interface front-end 104 via the user interface back-end 110 may include one or more objects, identifiers corresponding to the objects, a target success function, identification of one or more object attributes by the target success function, and so forth. The user interface back-end 110 may pass these received input parameters (or references to these parameters in the object data store 112) to the machine learning component 114 for performance of machine learning techniques.

In some examples, the machine learning component 114 is structured to process the input parameters using one or more machine learning algorithms. Examples of machine learning algorithms include, but are not limited to, regression algorithms, dependent variable algorithms, Bayesian algorithms, clustering algorithms, neural network algorithms, and/or other algorithms. These algorithms may be customized for particular target success functions by processing training data using supervised learning techniques.

In the present example, the machine learning component 114 is structured to evaluate the existing attributes of the objects present in the object data store 112 based on pre-configuration and/or machine learning techniques that are relevant for determining a predictive outcome. The machine learning component may include additional associations of target success functions to attributes, such that data values corresponding to attributes not identified by the user interface front-end 104 may also be input into the machine learning algorithm. For example, a selected target success function for determining a likelihood of a customer for buying a product may include a mapping to one or more attributes that identify previous purchases of the customer. Accordingly, the machine learning component 114 is structured to generate a predictive outcome by processing both input parameters received from a user and also other input parameters that the machine learning component 114 has associated with a target success function.

The machine learning component 114 is structured to output the predictive outcome to the user interface back-end 110, which is structured to relay the predictive outcome to the user interface front-end 104 for displaying the predictive outcome to a user. An example process for receiving input parameters and generating a predictive outcome is described in more detail with respect to FIG. 3.

While two computing devices are illustrated in the present example, in other examples there may be a single computing device or more than two computing devices. For example, the user interface front-end 104, user interface back-end 110, object database 112, and machine learning component 114 may also be implemented on a single computing device. Various components may also be combined. For example, if the techniques are implemented on a single computing device, the user interface front-end 104 and the user interface back-end 110 may be combined into a single application or module.

Figure 2:
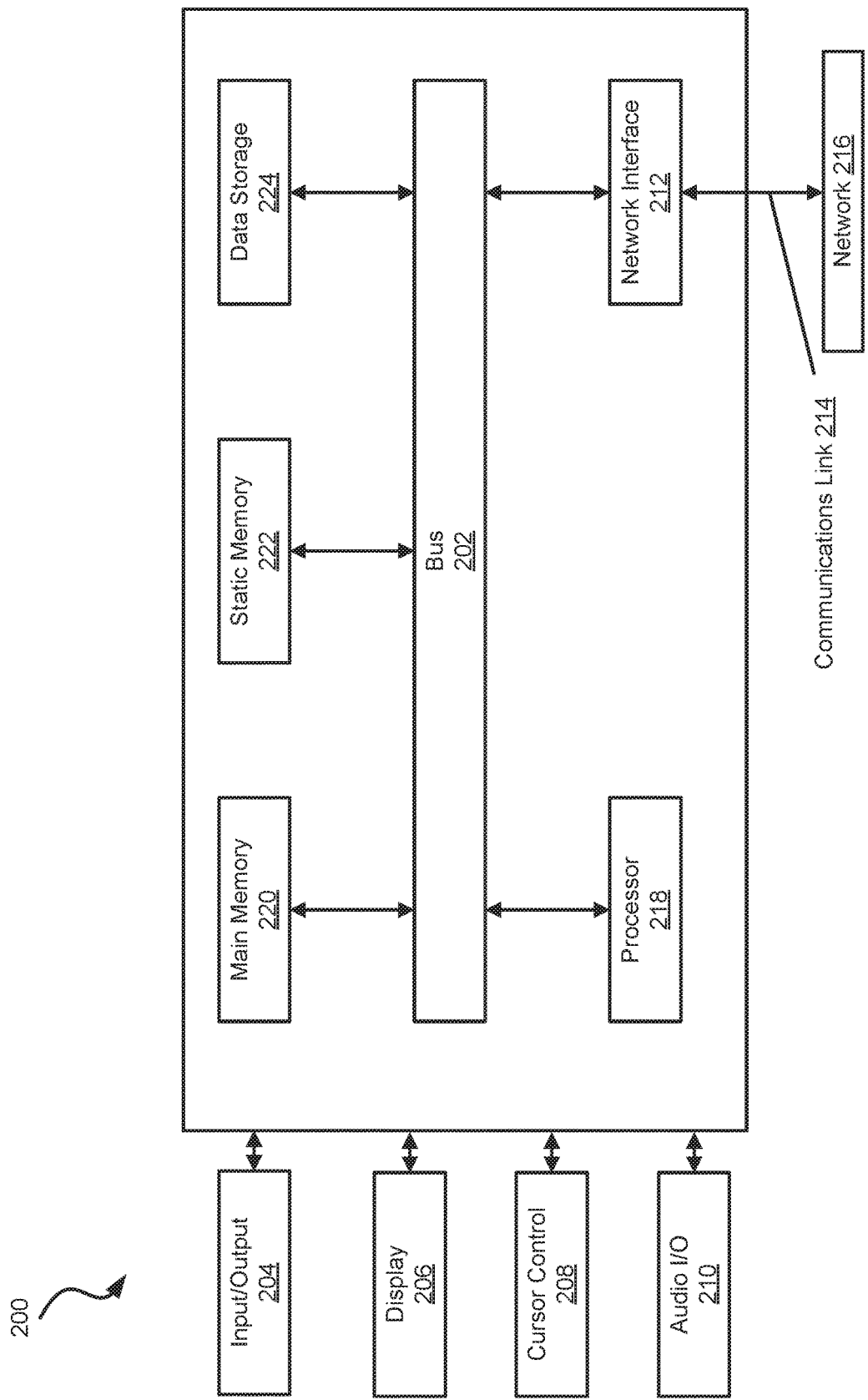
FIG. 2 is a block diagram illustrating a computer system suitable for implementing one or more computing devices.

FIG. 2 illustrates a computer system 200 suitable for implementing one or more computing devices of a computing system (e.g., the first computing device 102 and the second computing device 108). In various implementations, computer system 200 may structure a computing device as a smart or mobile phone, a computing tablet, a desktop computer, laptop, wearable device, or rack mount server.

Computer system 200 may include a bus 202 or other communication mechanisms for communicating information data, signals, and information between various components of computer system 200. Components include an I/O component 204 that processes a user action, such as selecting keys from a keypad/keyboard, selecting one or more buttons, links, actuatable elements, etc., and sends a corresponding signal to bus 202. I/O component 204 may also include an output component, such as a display 206 and a cursor control 208 (such as a keyboard, keypad, mouse, touch screen, etc.). An optional audio I/O component 210 may also be included to allow a user to hear audio and/or use voice for inputting information by converting audio signals.

A network interface 212 transmits and receives signals between computer system 200 and other devices, such as user devices, data servers, and/or other computing devices via a communications link 214 and a network 216 (e.g., such as a LAN, WLAN, PTSN, and/or various other wired or wireless networks, including telecommunications, mobile, and cellular phone networks).

The processor 218 represents one or more general-purpose processing devices such as a microprocessor, central processing unit, or the like. More particularly, processor 218 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 108 may also be one or more special-purpose processing devices such as an application specific integrated circuit (ASIC), a field programmable gate array (FPGA), a digital signal processor (DSP), network processor, or the like. Processor 218 is configured to execute instructions for performing the operations and steps discussed herein.

Components of computer system 200 also include a main memory 220 (e.g., read-only memory (ROM), flash memory, dynamic random access memory (DRAM) such as synchronous DRAM (SDRAM), double data rate (DDR SDRAM), or DRAM (RDRAM), and so forth), a static memory 222 (e.g., flash memory, static random access memory (SRAM), and so forth), and a data storage device 224 (e.g., a disk drive).

Computer system 200 performs specific operations by processor 218 and other components by executing one or more sequences of instructions contained in main memory 220. Logic may be encoded in a computer readable medium, which may refer to any medium that participates in providing instructions to processor 218 for execution. Such a medium may take many forms, including but not limited to, non-volatile media, volatile media, and/or transmission media. In various implementations, non-volatile media includes optical or magnetic disks, volatile media includes dynamic memory, such as main memory 220, and transmission media between the components includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 214 to the network 216 may perform instruction sequences to practice the present disclosure in coordination with one another. Modules described herein may be embodied in one or more computer readable media or be in communication with one or more processors to execute or process the steps described herein.

Figure 3:
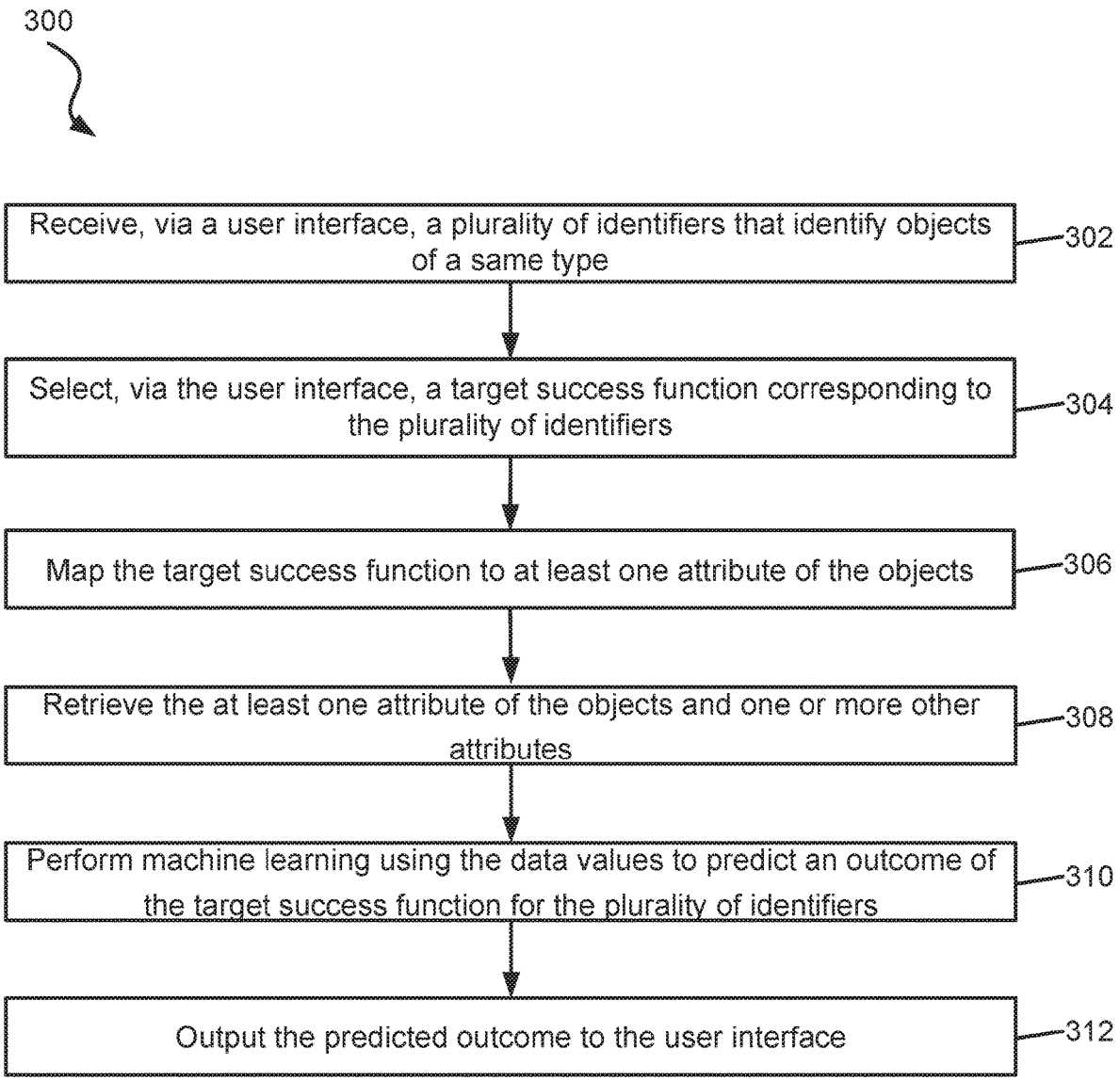
FIG. 3 is a flow diagram illustrating a machine learning technique, in accordance with various examples of the present disclosure.

FIG. 3 illustrates a machine learning technique, in accordance with various examples of the present disclosure. In some examples, the method 300 is implemented by one or more processors executing computer-readable instructions to perform the functions described herein. It is understood that additional steps can be provided before, during, and after the steps of method 300, and that some of the steps described can be replaced or eliminated in other examples of the method 300.

At action 302, a user interface receives a plurality of identifiers that identify objects of a particular type. In some examples, the plurality of identifiers are received and uploaded to a data store. In other examples, the user interface displays identifiers that are already stored in a data store, and a user may select the plurality of identifiers from a list or other user interface element.

Figures 4A, 4B, 4C:
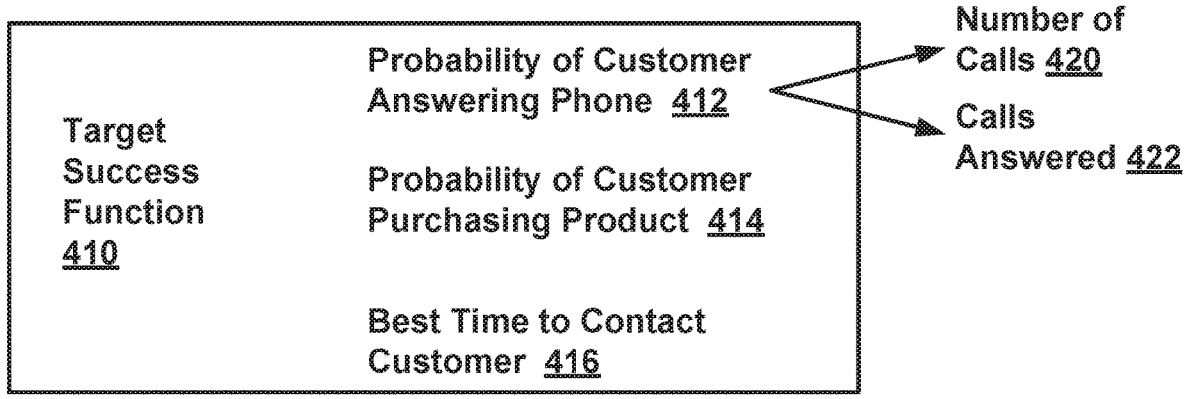
FIG. 4A is a block diagram illustrating a user interface suitable for selecting a plurality of identifiers, in accordance with various examples of the present disclosure.
FIG. 4B is a block diagram illustrating a plurality of customer objects that include identifiers and data values corresponding to attributes, in accordance with various examples of the present disclosure.
FIG. 4C is a block diagram illustrating a user interface suitable for selecting a target success function, which is mapped to attributes of one or more objects, in accordance with various examples of the present disclosure.

For example, as illustrated in FIG. 4A, an identifier selection user interface element 402 may be displayed to a user that provides one or more identifier options that may be selected. With respect to the example illustrated in FIG. 4A, identifier options may include: Dallas Customers 404, Chicago Customers 406, and New York Customers 408. In this example, by selecting Dallas Customers 404, the user may select the plurality of identifiers of customers who are associated with the Dallas Customers 404 option.

In some examples, each of the selectable identifier options corresponds to a particular database or other data store. For example, each identifier option that may be selected may correspond to a plurality of identifiers stored in a database. For example, FIG. 4B illustrates an example of a plurality of identifiers stored in a database that are associated with the Dallas Customers 404 identifier option. In this example, the Dallas Customers 404 identifier option includes the following identifiers 418: "John Smith," "Sally Jones," and "Alex Brown." Each identifier identifies a customer object. As shown, each row of the database stores a customer object that includes an identifier and data values corresponding to attributes of the customer object.

In FIG. 4B, the first customer object is the row of the database table that includes the identifier "John Smith." The customer object identified by the "John Smith" identifier includes a data value of "5" corresponding to the number of calls attribute 420, a data value of "4" corresponding to the calls answered attribute 422, and a data value of "0" corresponding to the products purchased attribute 424.

In FIG. 4B, the second customer object is the row of the database table that includes the identifier "Sally Jones." The customer object identified by the "Sally Jones" identifier includes a data value of "6" corresponding to the number of calls attribute 420, a data value of "2" corresponding to the calls answered attribute 422, and a data value of "2" corresponding to the products purchased attribute 424.

In FIG. 4B, the third customer object is the row of the database table that includes the identifier "Alex Brown." The customer object identified by the "Alex Brown" identifier includes a data value of "3" corresponding to the number of calls attribute 420, a data value of "3" corresponding to the calls answered attribute 422, and a data value of "2" corresponding to the products purchased attribute 424.

Each identifier may uniquely identify an object. In some examples, the identifier is configured as a primary key that may be used to locate one or more attributes corresponding to the object. Each object may include data values corresponding to the one or more attributes of the object. Objects of a same type may include a same data structure. For example, all customer objects may include an identifier and the same attributes. Accordingly, each object may differ in the data values that are assigned to the object identifier and object attributes.

Particular examples of the same type of objects include a plurality of customer objects, a plurality of merchant objects, or a plurality of product objects. For example, a plurality of customer objects may each include a same set of attributes used to describe the customers, where each object corresponds to a different customer. In another example, objects of a same type may include a plurality of objects corresponding to merchants, where each object corresponds to a different merchant. In yet another example, objects of a same type may include a plurality of objects corresponding to products, where each object corresponds to a different product.

In some examples, objects may be anonymized to restrict access to information included in the objects such as object identifiers and/or object attributes. In some examples, the anonymization may include replacing at least some object identifiers and/or attributes with randomly or pseudo-randomly generated data. For example, a customer object may include a customer name as an identifier and one or more customer attributes that include data values that specify a customer social security number, phone number, and/or address. The identifier and/or the one or more data values corresponding to customer attributes may be removed and/or replaced with other data. The identifiers and/or data values may be selectively anonymized by a user to anonymize sensitive data while leaving in place data values corresponding to other attributes that are used by a target success function.

Returning now to the discussion of FIG. 3, at action 304, the user interface receives a selection of a target success function corresponding to the plurality of identifiers. In some examples, the target success function may be a pre-configured target success function that is displayed to a user for selection via a label, list or other graphical user interface element.

For example, as illustrated in FIG. 4C, a target success function user interface element 410 may be displayed to a user that provides one or more target success function options that may be selected. For example, each target success function may correspond to a particular predicted outcome. With respect to FIG. 4C, the target success functions that a user may select are the probability that each customer will answer a phone 412, the probability that each customer will purchase a product 414, and the best time to contact each customer 416.

In other examples, the target success function may be configured for selection by a user on an as-needed basis. For example, the user interface may include a text box graphical user interface element where a user may input a text string that identifies a target success function and its associated parameters. In more detail, the text string may include an SQL query string that identifies particular attributes of objects that a user intends to pass to a machine learning component.

Returning now to the discussion of FIG. 3, at action 306, the user interface maps the selected target success function to at least one attribute of one or more attributes of the objects. The success function attributes mapped to a target success function may be pre-configured, such that the mapping is performed at a back-end that is not displayed by a user. For example, a data architect may configure a plurality of target success functions that each are associated with particular attributes of objects. Accordingly, target success functions may be selected by a user at a user interface without the user having to identify the attributes of the objects to input into a machine learning component. However, in other examples, users may be provided user interface elements to configure target success functions and/or map target success functions to particular attributes.

For example, as illustrated in FIG. 4C, the target success function to determine the probability that each customer will answer a phone 412 is mapped to/associated with the number of calls attribute 420 and the calls answered attribute 422. Thus, by selecting the probability that each customer will answer a phone 412 target success function, the number of calls attribute 420 and the calls answered attribute 422 are selected as attributes to provide to a machine learning component.

A mapping may include any association of a target success function with particular attributes of objects. For example, a target success function for identifying a product that has a highest likelihood of market success may be associated with a current sales attribute of a plurality of product objects. Accordingly, by selecting the target success function, the data values corresponding to the current sales attribute of the product objects may be input into a machine learning component without requiring a user selection of the current sales attribute. Associations/mappings may be provided using data structures such as lists, tables, references, and so forth. In some examples, success function attributes are mapped to a success function by providing a query string, such as an SQL statement, that includes the success function attributes as parameters.

Returning now to the discussion of FIG. 3, at action 308, a user initiates a query request using the user interface to retrieve success function attributes. The query performs a search of the data values that are associated with the success function attributes that are mapped to the selected success function. For example, as described in the above example, a target success function may specify a current sales attribute. Accordingly, in this example, the data values corresponding to the current sales attribute may be queried from a plurality of product objects.

In addition, one or more other attributes that are not mapped to a target success function may also be queried. In more detail, other attributes of the objects may be relevant for determining a predictive result. These other predictor attributes may be identified by a data architect and/or machine learning component. Accordingly, these one or more other predictor attributes may also be queried to obtain data values corresponding to these attributes. In some examples, the queries are performed by a database management system (DBMS) to obtain the data values from a database or other data store.

The data values corresponding to the queried at least one success function attribute and the one or more other predictive attributes are retrieved. These data values may be retrieved by the user interface and provided to a machine learning component. In other examples, the machine learning component or other component may perform the query to retrieve the data values.

For example, with respect to the examples illustrated in FIG. 4B and FIG. 4C, if the target success function for the probability of each customer answering the phone 412 is selected, the data values are queried that correspond to the attributes for the number of calls 420 and the calls answered 422. Thus, the query would locate the "5" and "4" data values corresponding to the "John Smith" identifier, the "6" and "2" data values corresponding to the "Sally Jones" identifier, and the "3" and "3" data values corresponding to the "Alex Brown" identifier.

Returning now to the discussion of FIG. 3, at action 310, the machine learning component processes the retrieved data values to predict an outcome of the target success function for the plurality of identifiers. The machine learning component may be capable of non-discriminatory use of all attributes of the objects and their retrieved data values to build a prediction model best suited to predict the target success function outcomes. The machine learning component can include logic to select the attributes of the objects that compose the best data set via heuristic or other approaches. The machine learning component may be pre-configured by a data architect for the particular target success function. For example, a data architect may perform supervised learning techniques to configure the machine learning component using training data.

In some examples, success function attributes are structured as dependent variables that are used by the machine learning component for determining a predictive outcome, while the predictor attributes are structured as independent variables that are used by the machine learning component for determining the predictive outcome.

At action 312, the machine learning component determines a predicted outcome corresponding to the target success function. In some examples, the predicted outcome is structured as a binary (yes/no) outcome, an incremental (positive/negative) outcome, a probability of success, a revenue amount, or other data value type. The predicted outcome may further be associated with a confidence interval that identifies an estimated accuracy corresponding to the predicted outcome. The confidence interval may be based on analysis of historical outcomes by the machine learning component using training data.

The user interface receives the predicted outcome, which may include the confidence interval, and outputs one or both of these data values to the user interface. Accordingly, the predicted outcome is displayed to one or more users.

For example, with respect to FIG. 4B and FIG. 4C, if the probability of a customer answering the phone 412 target success function is selected, the machine learning component may calculate that the customer "John Smith" has a ⅘ or 80% likelihood of answering the phone, that the customer "Sally Jones" has a ⅖ or 33% likelihood of answering the phone, and that the customer "Alex Brown" has a 3/3 or 100% likelihood of answering the phone.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A system related to improved machine learning outcomes for actions taken by individual persons, comprising:
   a processor; and
   a non-transitory computer-readable medium having stored thereon instructions that are executable by the processor to cause the system to perform operations comprising:
      causing display, on a user device, of a user interface configured to provide access to a plurality of machine learning models;
      receiving, via the user interface, a selection of a target success function from a plurality of target success functions and identifications of a plurality of person data objects,
         wherein the target success function is configured to measure a probability of occurrence of one or more specified computer-based actions to be selected by a user via one or more hardware user interfaces of a user computing device, and
         wherein each person data object in the plurality of person data objects corresponds to a particular individual person and is associated with a set of attributes;
      identifying, from the plurality of machine learning models, a particular machine learning model based on the selection of the target success function;
      determining a set of input parameters for using the particular machine learning model;
      selecting, from the set of attributes associated with each of the plurality of person data objects, a subset of attributes for using the particular machine learning model to perform the target success function based on the set of input parameters;
      obtaining, from the plurality of person data objects, attribute values corresponding to the subset of attributes;
      identifying, from the attribute values, a subset of attribute values usable to identify the plurality of person data objects;
      generating input values corresponding to the set of input parameters for using the particular machine learning model based on the attribute values and the subset of attribute values;
      generating, for each person data object in the plurality of person data objects, a corresponding prediction outcome by using the particular machine learning model based on the input values; and
      providing, on the user interface, the corresponding prediction outcomes for the plurality of person data objects, wherein the corresponding prediction outcomes are indicative of probabilities of occurrence of the one or more specified computer-based actions to be selected by corresponding users associated with the plurality of users person data objects via a plurality of hardware user interfaces of a plurality of user computing devices.

2. The system of claim 1, wherein the one or more specified computer-based actions to be selected by the corresponding users via the plurality of hardware user interfaces of the plurality of user computing devices comprise the corresponding users selecting, via at least one of a computer mouse or a touchscreen, one or more particular graphical elements displayed on a plurality of web pages.

3. The system of claim 1, wherein the operations further comprise:
   anonymizing the attribute values based on replacing the subset of attribute values with replacement values, wherein the input values are generated based at least in part on the replacement values; and
   storing a mapping between the subset of attribute values and the replacement values.

4. The system of claim 1, wherein the subset of attributes includes a first attribute that is a dependent variable used by the particular machine learning model and a second attribute that is an independent variable used by the particular machine learning model.

5. The system of claim 1, wherein the operations further comprise:
   providing, to the user interface, a confidence level corresponding to the prediction outcomes.

6. The system of claim 1, wherein the operations further comprise presenting the plurality of target success functions on the user interface for selection by a user of the user device.

7. The system of claim 1, wherein the set of attributes of a person data object includes a unique identifier attribute for identifying a corresponding person, and a prior transaction attribute that specifies information regarding one or more previous electronic transactions conducted by the corresponding person.

8. A non-transitory computer-readable medium having stored thereon machine-readable instructions executable to cause a computer system to perform operations comprising:
   causing display, on a user device, of a user interface configured to provide access to a plurality of machine learning models;
   receiving, via the user interface, a selection of a target success function from a plurality of target success functions and identifications of a plurality of person data objects,
      wherein the target success function is configured to measure a probability of occurrence of one or more specified computer-based actions to be selected by a user via one or more hardware user interfaces of a user computing device, and
      wherein each person data object in the plurality of person data objects corresponds to a particular individual person and is associated with a set of attributes;
   identifying, from the plurality of machine learning models, a particular machine learning model based on the selection of the target success function;
   determining a set of input parameters for using the particular machine learning model;
   selecting, from the set of attributes associated with each of the plurality of person data objects, a subset of attributes for using the particular machine learning model to perform the target success function based on the set of input parameters;
   obtaining, from the plurality of person data objects, attribute values corresponding to the subset of attributes;

generating input values corresponding to the set of input parameters for using the particular machine learning model based on the attribute values;

generating, for each person data object in the plurality of person data objects, a corresponding prediction outcome by using the particular machine learning model based on the input values; and providing, on the user interface, the corresponding prediction outcomes for the plurality of person data objects, wherein the corresponding prediction outcomes are indicative of probabilities of occurrence of the one or more specified computer-based actions to be selected by corresponding users associated with the plurality of person data objects via a plurality of hardware user interfaces of a plurality of user computing devices.

9. The non-transitory computer-readable medium of claim 8, wherein the one or more specified computer-based actions to be selected by the corresponding users via the plurality of hardware user interfaces of the plurality of user computing devices comprise the corresponding users selecting, via at least one of a computer mouse or a touchscreen, one or more particular graphical elements displayed on a plurality of web pages.

10. The non-transitory computer-readable medium of claim 8, wherein the input values are generated from the plurality of person data objects without requiring further inputs from a user of the user device.

11. The non-transitory computer-readable medium of claim 8, wherein the subset of attributes includes a first attribute that is a dependent variable used by the particular machine learning model and a second attribute that is an independent variable used by the particular machine learning model.

12. The non-transitory computer-readable medium of claim 8, wherein the operations further comprise:

providing, to the user interface, a confidence level corresponding to the prediction outcomes.

13. The non-transitory computer-readable medium of claim 8, wherein the operations further comprise presenting the plurality of target success functions on the user interface for selection by a user of the user device.

14. The non-transitory computer-readable medium of claim 8, wherein the set of attributes of a person data object includes a unique identifier attribute for identifying a corresponding person, and a prior transaction attribute that specifies information regarding one or more previous electronic transactions conducted by the corresponding person.

15. A method related to improved machine learning outcomes for actions taken by individual persons, comprising:

causing display, on a user device, of a user interface configured to provide access to a plurality of machine learning models;

receiving, via the user interface, a selection of a target success function from a plurality of target success functions and identifications of a plurality of person data objects, wherein the target success function is configured to measure a probability of occurrence of one or more specified computer-based actions to be selected by a user via one or more hardware user interfaces of a user computing device, and wherein each person data object in the plurality of person data objects corresponds to a particular individual person and is associated with a set of attributes;

identifying, from the plurality of machine learning models, a particular machine learning model based on the selection of the target success function;

determining a set of input parameters for using the particular machine learning model;

selecting, from the set of attributes associated with each of the plurality of person data objects, a subset of attributes for using the particular machine learning model to perform the target success function based on the set of input parameters;

obtaining, from the plurality of person data objects, attribute values corresponding to the subset of attributes;

identifying, from the attribute values, a subset of attribute values usable to identify the plurality of person data objects;

generating input values corresponding to the set of input parameters for using the particular machine learning model based on the attribute values and the subset of attribute values;

generating, for each person data object in the plurality of person data objects, a corresponding prediction outcome by using the particular machine learning model based on the input values; and providing, on the user interface, the corresponding prediction outcomes for the plurality of person data objects, wherein the corresponding prediction outcomes are indicative of probabilities of occurrence of the one or more specified computer-based actions to be selected by a plurality of corresponding users associated with the plurality of person data objects via a plurality of hardware user interfaces of a plurality of user computing devices.

16. The method of claim 15, wherein the one or more specified computer-based actions to be selected by the corresponding users via the plurality of hardware user interfaces of the plurality of user computing devices comprise the corresponding users selecting, via at least one of a computer mouse or a touchscreen, one or more particular graphical elements displayed on a plurality of web pages.

17. The method of claim 15, wherein the input values are generated from the plurality of person data objects without requiring further inputs from a user of the user device.

18. The method of claim 15, wherein the subset of attributes includes a first attribute that is a dependent variable used by the particular machine learning model and a second attribute that is an independent variable used by the particular machine learning model.

19. The method of claim 15, further comprising presenting the plurality of target success functions on the user interface for selection by a user of the user device.

20. The method of claim 15, wherein the set of attributes of a person data object includes a unique identifier attribute for identifying a corresponding person, and a prior transaction attribute that specifies information regarding one or more previous electronic transactions conducted by the corresponding person.

* * * * *

UNITED STATES PATENT AND TRADEMARK OFFICE
CERTIFICATE OF CORRECTION

PATENT NO. : 11,704,594 B2
APPLICATION NO. : 17/514760
DATED : July 18, 2023
INVENTOR(S) : Egor Kobylkin It is certified that error appears in the above-identified patent and that said Letters Patent is hereby corrected as shown below:

In the Claims

Claim 1, Column 11, Line 65, change "the plurality of users person data objects" to --the plurality of person data objects--.

Signed and Sealed this
Twelfth Day of September, 2023

Katherine Kelly Vidal
*Director of the United States Patent and Trademark Office*